Nov. 1, 1949.    R. S. GRAHAM    2,486,643
REVERSIBLE PROPELLER
Filed Feb. 6, 1946    2 Sheets-Sheet 1

INVENTOR.
Richard S. Graham
BY
Victor J. Evans & Co.
ATTORNEYS

Nov. 1, 1949. R. S. GRAHAM 2,486,643
REVERSIBLE PROPELLER
Filed Feb. 6, 1946 2 Sheets-Sheet 2
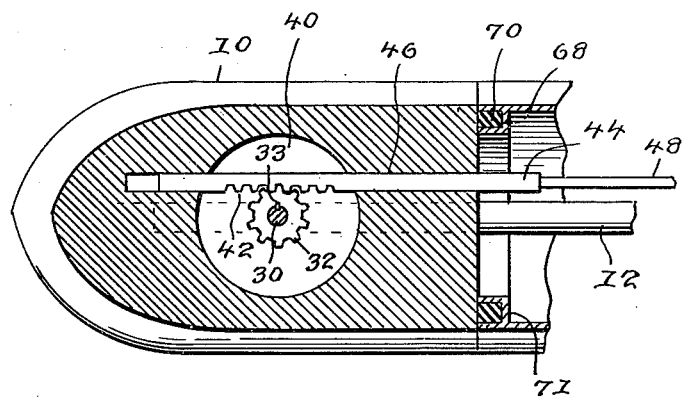
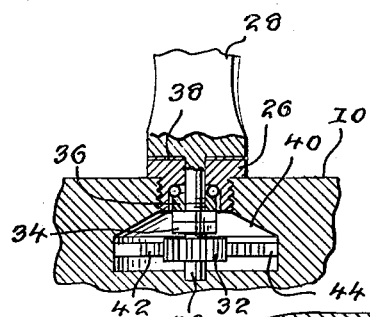
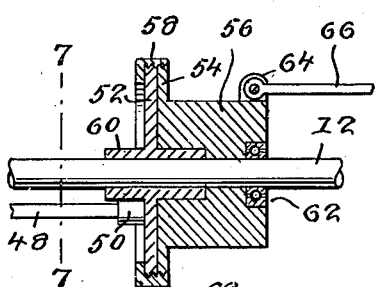
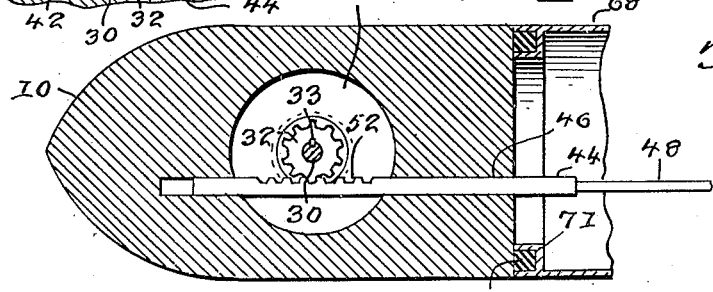
INVENTOR.
Richard S. Graham
BY
Victor J. Evans & Co.
ATTORNEYS Patented Nov. 1, 1949

2,486,643

UNITED STATES PATENT OFFICE 2,486,643

REVERSIBLE PROPELLER

Richard S. Graham, Niles, Mich.

Application February 6, 1946, Serial No. 645,784

1 Claim. (Cl. 170—160.23)

This invention relates to a reversible propeller which can be used for airplanes or ski-sleds.

An object of the invention is to provide a propeller that will slow down an airplane for landing or reducing the speed of a ski-sled.

Another object of the invention is to provide a propeller having means therein for varying the pitch of the blades to meet varying conditions.

With the foregoing and other objects and advantages in view the invention consists of the novel details of construction, arrangement and combination of parts more fully hereinafter described, claimed and illustrated in the accompanying drawings in which:

Figure 3 is a sectional view on the line 3—3 of Figure 1.

Figure 4 is a sectional view on the line 4—4 of Figure 1.

Figure 5 is a detailed sectional view, of the cylinder shown in Figure 1.

Figure 6 is a detailed sectional view of the manner for connecting the blades and Figure 7 is a view on the line 7—7 of Figure 5.

Figure 1:
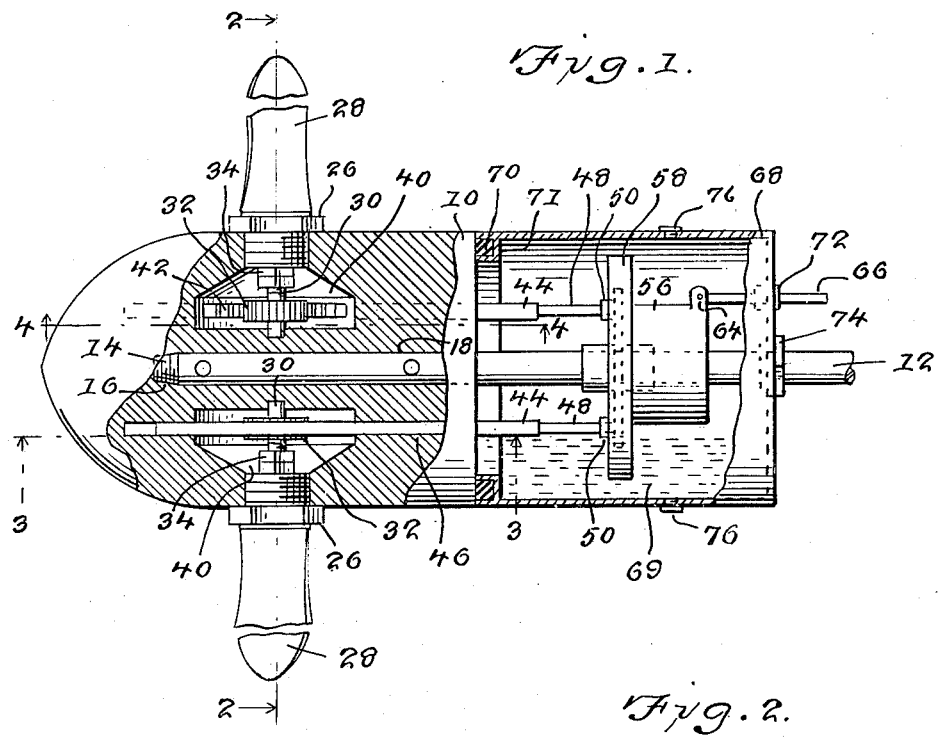
Figure 1 is an elevational view of an embodiment of the invention partly in section and partly broken away.
Figure 2:
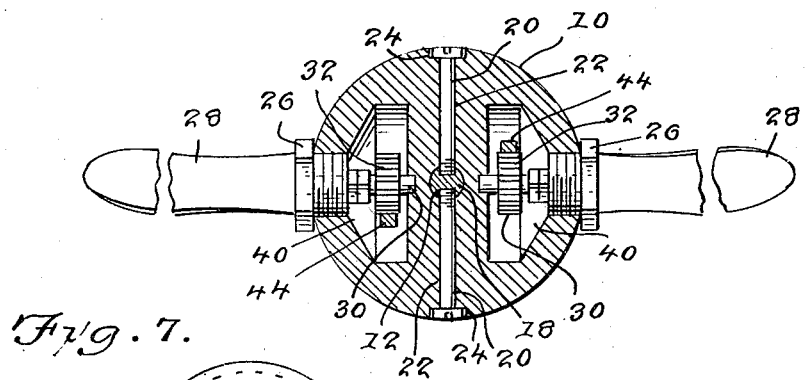
Figure 2 is a sectional view on the line 2—2 of Figure 1.
Figure 7:
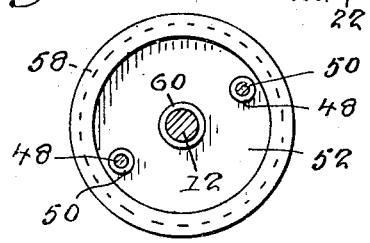

Referring more in detail to the drawing the reference numeral 10 designates the hub of the propeller which is secured to a propeller shaft 12 by means of the threaded end 14 of the shaft being received in the threaded seat 16 at the end of the base 18 in which the shaft 12 is positioned.

Screws 20 oppositely positioned with relation to each other are positioned transversely of the hub 10 in bores 22 and the ends of the screws 20 are threaded for reception in the threaded seats in the shaft 12, thus maintaining the shaft in fixed relation to the hub 10. The heads of the screws are countersunk as at 24 to present an unbroken outer surface on the hub.

Hubs 26 for mounting the blades 28 are mounted in the hub in opposite relation to each other and in right angled relation to the screws 20. The blades are provided with shafts 30 which extend through the hubs 26 inwardly of the hub 10 and gears 32 are firmly fixed to the shafts 30 by keys 33. The shafts 30 are partially threaded to receive nuts 34 which are tightened against the bearing races 36 to prevent play in the blades between the blades and the hubs 26.

A frictionless washer 38 is positioned between the blades and the hubs.

The ends of the shaft 30 are journalled in the hub 10 and the gears 32 as well as the shaft and nuts 34 are mounted in the recesses 40 in the hub 10.

Coacting with the gears 32 are the racks 42 on the outer ends of the bars 44 which are reversely positioned with relation to each other and extend longitudinally of the hub in bores 46 and are connected at the opposite ends to the rods 48 which are fastened in the threaded bosses 50 on the disc 52 mounted in face to face relation with the disc flange 54 of the cylinder 56 by means of the internally threaded flanged collar 58. The disc 52 is internally splined for connection to the splined hub 60 mounted on the shaft 12 and the hub extends into the cylinder 56 whereby the discs and cylinders are mounted on the shaft 12.

A ball race 62 in the cylinder 56 engages the shaft 12 and the cylinder 56 is provided with an apertured lug 64 to which is connected the rod 66 to an operating lever not shown.

A cylindrical housing 68 containing oil 69 and adapted to inclose the cylinder and its associated parts is secured to the rear end of the hub and a gasket 70 and flanged collar 71, provide a liquid tight seal between the housing 68 and the hub 10. Thus the cylinder and its associated parts work in oil at all times, packing glands 72 and 74 are provided for the shaft 12 and rod 66 to prevent leakage of the oil in the housing, and the housing is provided with plugs 76 which are oppositely positioned to each other and may be used as drain or filling plugs for the housing.

The operation of the device is as follows: By sliding the cylinder 56 on the shaft 12 by means of the rod 66 the racks 42 coacting with the gears 32 vary the pitch of the blades 28 thus reducing the speed of the machine to which the propeller is attached.

It is believed that the operation and construction of the propeller will be apparent to those skilled in the art and it is to be understood that changes in the details of construction, arrangement and combination of parts may be resorted to providing they fall within the spirit of the invention and the scope of the appended claim.

Having thus described the invention what is claimed as new and desired to be secured by Letters Patent is:

A device of the character described, comprising a driven shaft, a hub fixed on the outer end of said shaft, a cylindrical housing containing oil fixed on the inner end of said hub and extended over said shaft, propeller blades mounted in said hub, a shaft for each of said blades, a gear fixed on each shaft, bars extending longitudinally of said hub and said cylinder, a rack portion formed on said bars coacting with the gears on the blades, for rotation of the shafts to vary the pitch of said blades, a disc sleeved on said shaft in said housing, a second disc having face to face engagement with said first disc, a cylinder formed on the rear end of said second disc, bosses formed on the front of said first disc in spaced relation to each other and the ends of said bars fixed in said bosses, the periphery of said discs being screw threaded and an internally threaded flanged collar screwed on the screw threads to retain the discs in face to face relation with each other, a control rod connected to the rear of said cylinder whereby said discs are adapted for actuating said longitudinally extending bars for varying the pitch of the blades.

RICHARD S. GRAHAM.

REFERENCES CITED

The following references are of record in the file of this patent:

UNITED STATES PATENTS

| Number | Name | Date |
|---|---|---|
| 785,369 | Meinecke | Mar. 21, 1905 |
| 816,836 | Adams | Apr. 3, 1906 |
| 1,839,895 | Rossi | Jan. 5, 1932 |
| 1,908,893 | Edman | May 16, 1933 |
| 2,279,633 | Merickle | Apr. 14, 1942 |